United States Patent [19]
Williams

[11] 3,950,204
[45] Apr. 13, 1976

[54] LOW PRESSURE, THIN FILM BONDING

[75] Inventor: Warren D. Williams, Dallas, Tex.

[73] Assignee: Texas Instruments Incorporated, Dallas, Tex.

[22] Filed: July 29, 1974

[21] Appl. No.: 492,385

Related U.S. Application Data

[63] Continuation of Ser. No. 293,708, Sept. 29, 1972, abandoned.

[52] U.S. Cl. ............... 156/235; 156/285; 156/325; 156/330
[51] Int. Cl.² ........................................ B29C 27/12
[58] Field of Search ........... 156/230, 235, 285, 286, 156/289, 313, 320, 330, 381, 382, 325, 326; 343/767, 772

[56] References Cited
UNITED STATES PATENTS

| | | | |
|---|---|---|---|
| 3,481,814 | 12/1969 | Salyer et al. | 156/330 |
| 3,706,621 | 12/1972 | Lichtman | 156/285 |
| 3,723,223 | 3/1973 | Compte | 156/330 |

Primary Examiner—Caleb Weston
Attorney, Agent, or Firm—Harold Levine; Rene' E. Grossman; Alva H. Bandy

[57] ABSTRACT

Disclosed is a method particularly useful in fabricating microwave components for joining two metallic surfaces together to form an extremely strong bond, having good electrical and mechanical characteristics. One surface is primed or prepared with a suitable primer. An alloy adhesive, such as a polyamide-epoxy, is either deposited on the prepared surface or, if the adhesive is in film form on a release paper, then the film and release paper are heat tacked or ironed onto the prepared metallic surface. The paper release backing is then removed and the two metallic surfaces are mechanically assembled and positioned within a vacuum bag. The bag is evacuated and subjected to normal atmospheric pressure (14 psi) and heated to approximately 350° for 1 hour whereupon the component is allowed to cool to 100°F at which time the vacuum may be released and the component removed from the bag.

4 Claims, 4 Drawing Figures

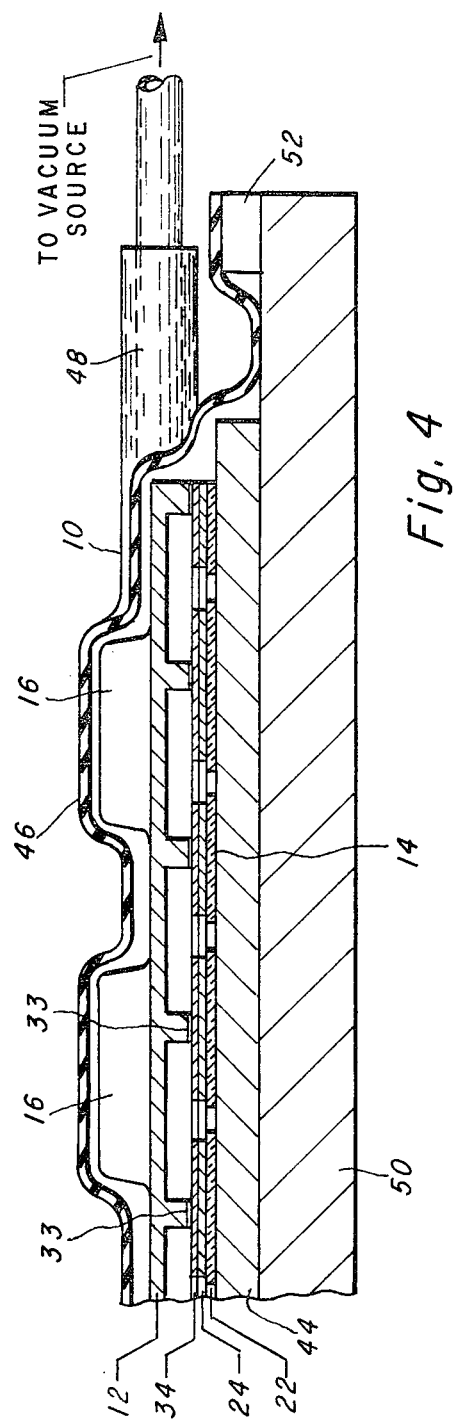

LOW PRESSURE, THIN FILM BONDING

This is a continuation, of application Ser. No. 293,708, filed Sept. 29, 1972 now abandoned.

This invention relates to bonding and more particularly to a method for bonding metallic surfaces together to obtain good electrical conductivity therebetween.

Heretofore in the fabrication and manufacture of microwave components, such as array antennas and waveguides, dip brazing is the standard fabrication method for connecting metallic portions together. However in fabricating microwave components having very thin metallic walls, the dip brazing process, which requires temperatures in the order of 1100°F, causes warpage which increases the reject rate and cost of the component; furthermore severe design limitations are imposed by these high temperatures. Still further dip brazing limits the size of the components which can be fabricated (such as a large flat plate antenna) due to the size of the salt bath tank.

Accordingly, it is an object of the present invention to provide an improved bonding technique for joining metallic surfaces and obtain good electrical conductivity therebetween.

Another object of the present invention is to provide an improved connecting method for microwave components without limit as to their size.

Another object of the present invention is to provide a method of thin film bonding fragile metallic parts at low curing temperatures.

Another object of the present invention is to provide a low pressure bonding technique for fragile metallic components to achieve the lightest weight and to simplify tooling required to achieve flatness, reduce warpage and maintain part alignment.

Another object of the present invention is to provide a thin film bonding technique for microwave components which permits the use of dielectric materials having metallic surfaces thereon for component construction.

Another object of the present invention is to provide a technique which allows a very uniform bond thickness between two metallic surfaces over a large surface area by using a filmed adhesive.

Another object of the present invention is to provide a technique which allows for selectively patterning and prepositioning the adhesive.

Still another object of the present invention is to provide a thin film bonding technique which permits a thin, yet strong bond to be obtained for electrical continuity and electrical characteristic repeatability.

Still another object of the present invention is to provide a low pressure, low temperature thin film bonding technique which is simple, easy to implement and represents substantial cost savings over prior art techniques.

Other objects and teachings of the invention will become more readily understood from the following detailed description and appended claims when read in conjunction with the accompanying drawings, in which like reference numerals designate like parts throughout the figures thereof, and in which:

FIG. 4 illustrates the assembled flat plate antenna in a vacuum bag for joining the two metallic sections of the flat plate antenna together by bonding same.

Figure 1:
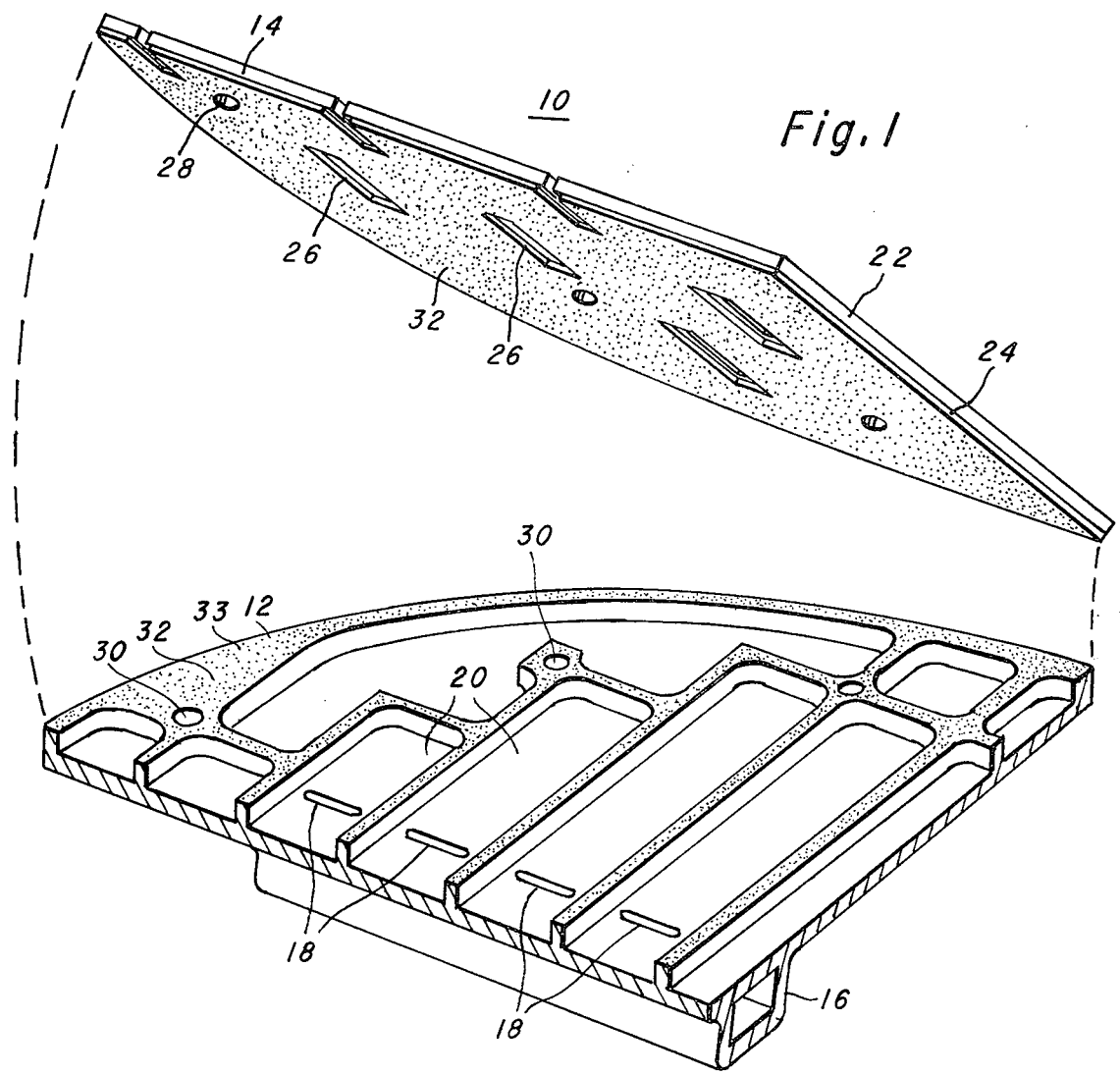
FIG. 1 is a breakaway view of a quarter section of a flat plate antenna prior to assembly according to the present invention.

Referring now to FIG. 1, there is illustrated a microwave component, such as flat plate antenna 10, which is comprised of rear plate section 12 and front face plate section 14. Only one quarter of the antenna 10 is illustrated and, in reality, antenna 10 may be circular in configuration. Although the bonding technique to be described is with reference to the fabrication of antenna 10, it will be recognized that other microwave components can be joined or bonded in the same manner, for example waveguides and microwave cavities which contain pressure sensitive and heat sensitive devices such as glass diodes or integrated circuits. Antenna 10 is a slotted waveguide-type in which microwave energy is fed through feed guide 16 located on the back side of section 12, and this microwave energy exits through slots 18. Section 12 of antenna 10 is made of aluminum or other suitable material. Slots 18 feed the microwave energy into a plurality of shunt guides 20.

Section 14 of antenna 10 may be comprised of a dielectric 22 such as Teflon, the synthetic resin polymer manufactured by E. I. duPont de Nemours & Company, which has afixed thereto a metallic surface 24. Alternatively front face plate section 14 may be made completely of metal. This metallic surface may be aluminum or other suitable metallic material. The dielectric 22 and metallic surface 24 may have a plurality of slots 26 which overlay respective shunt guides 20 to allow for the emission of microwave radiation from antenna 10. Also shown in section 14 are apertures 28 used for aligning front section 14 with the apertures 30 of rear section 12.

The method of bonding section 12 to section 14 to form a microwave component such as antenna 10 comprises the step of applying a thin coat of an epoxy resin as a tack primer 32 on either or both, preferably both the metallic surfaces which are to be bonded and have been cleaned, namely metallic surface 24 of front face plate section 14 and metallic surface 33 of the rear plate section 12. After application of the primer coat 32 to either or both the metallic surfaces 24 and 33, the primer is allowed to dry. A suitable primer is a polyamide epoxy in methyl alcohol which constitutes a solvent blend sold under the trademark BR-1009-49 by American Cyanamide Company.

Figure 2:
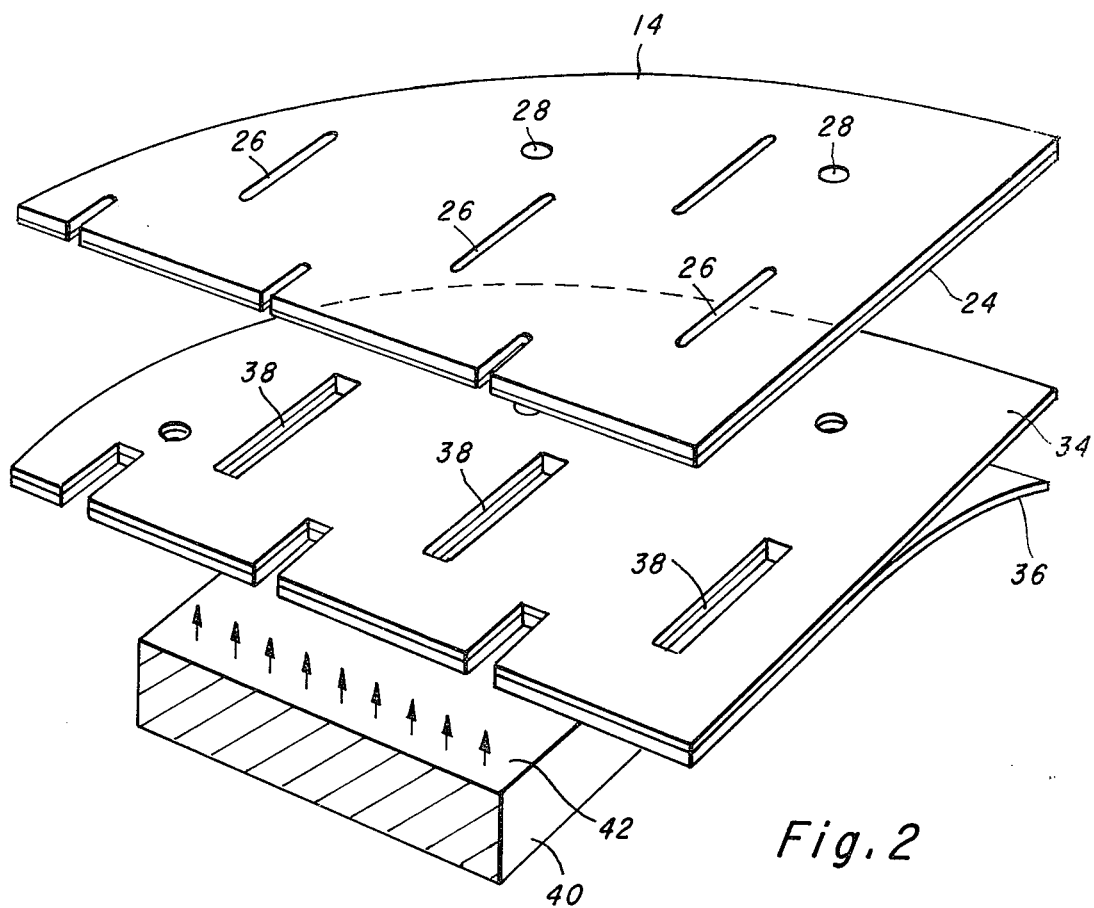
FIG. 2 illustrates the application of an adhesive film on one metallic surface of the flat plate antenna.

FIG. 2 illustrates the step of applying an adhesive film 34 to the cleaned metallic surface 24 of front face plate section 14. Adhesive film 34 has a release paper backing 36 which is removable after attachment of film 34 to metallic surface 24. The adhesive film 34 and release paper backing 36 is cut to fit the contour of front face plate section 14. Furthermore slots 38 can be pre-cut from film 34 and paper 36 in order that no adhesive film 34 bridges slots 26 on front face plate section 14. Adhesive film 34 may be from the thermoset-thermoplastic group, such as a polyamide-epoxy approximately 1 mil thick; a suitable adhesive film is a polyamid epoxy sold under the trademark FM-1041R by American Cyanamide Company. For additional information on adhesives, reference is made to Military Standardization Handbook on Adhesives, MIL-HDBK- 691A dated May 17, 1965. The adhesive film 34 and backing paper 36 is heat pressed or "tacked" on to the primed metallic surface 24 by iron 40 generating heat 42, said iron being heated to approximately 175°F. After the film 34 and backing paper 36 are heat tacked onto section 14, backing paper 36 is then removed by peeling it from the film 34. Other methods of uniformly applying adhesive 34 to metallic surface 24 are equally acceptable such as by srpaying or roller coating. The thickness of adhesive 34 must be limited to an amount which will achieve good shear strength of the bond between metallic surface 24 and metallic surface 33 (FIG. 1) and also allow a good electrical conductivity therebetween.

Figure 3:
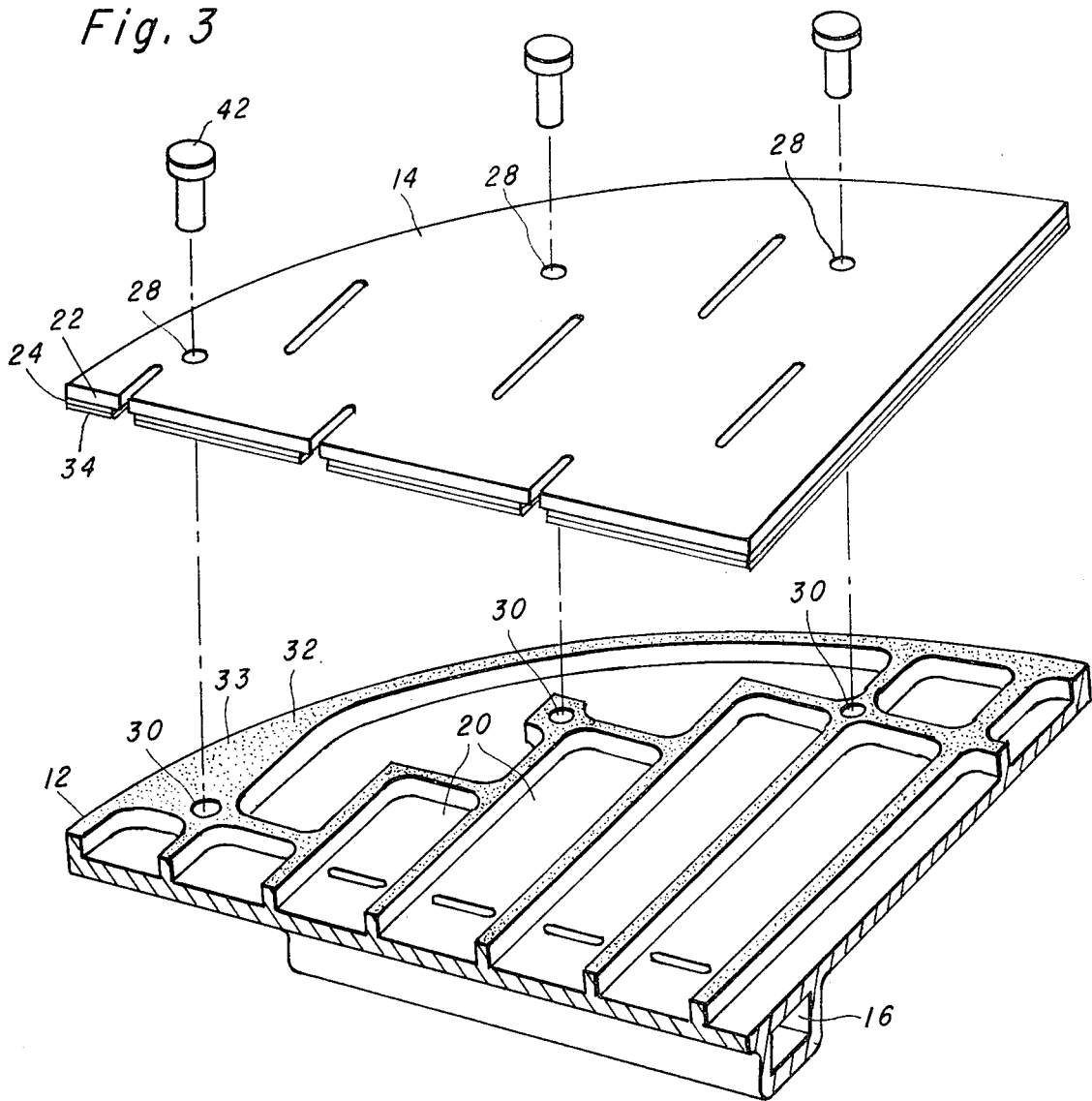
FIG. 3 illustrates the positioning and aligning step between one section of the flat plate antenna having the adhesive film attached thereto and the second section of the antenna.

FIG. 3 illustrates section 14 of antenna 10 ready to be bonded to rear section 12 of antenna 10. Adhesive film 34 is afixed to metallic surface 24 on the front face plate section 14 and aligning means such as pins 42 are inserted through apertures 28 and 30 of sections 14 and 12, respectively, to align and orient the face plate 14 and adhesive film 34 with the second metallic surface 33.

FIG. 4 illustrates the assembled antenna 10 with the front face plate section 14 face down on a flat surface plate 44. The assembled antenna 10 is covered with a vacuum bag 46 made of nylon film by way of example, bag 46 being sealed to a tray 50 with vacuum bag sealing tape 52. A vacuum hose 48 is inserted into vacuum bag 46 and is also sealed; this vacuum hose is connected to a vacuum source (not shown). Vacuum bagging has a number of advantages among which are low cost and ease of accommodating odd shape configurations such as are produced by feed guide 16. A further advantage of vacuum bag 44 is that uniform pressure is obtainable regardless of the irregularities in the part because of the conformal nature of vacuum bag 46, and it is not limited as to size of parts which can be joined.

A vacuum is pulled on the bag by the vacuum source of at least 29 inches of mercury such that the atmospheric pressure against the vacuum bag 46 is approximately 14 psi. Tray 50, surface plate 44 and the assembled antenna 10 are placed in an oven (not shown). The temperature in the oven is raised to approximately 350°±10°F in 30 minutes and then held at 350°F±10°F for 1 hour. The time-temperature relationship may be varied as long as a complete cure is obtained. The microwave component or antenna 10 is held under vacuum during the cure cycle in the oven and during the subsequent cooldown until 100°F is reached. At this time, the vacuum may then be released and the cured assembly removed from the surface plate 44 below 100°F. Utilizing this method, a strong mechanical bond between metallic surfaces 24 and 33 is obtained with good electrical characteristics.

The adhesive bonding technique according to the present invention requires only a 350°F cure temperature which permits the use of organic materials as structural components which may be metalized to achieve electrical conductivity. In other words, clad and etched metallic surfaces on dielectric face sheets such as are used with section 14 are realizable with the bonding technique hereinabove described. Furthermore this technique allows the use of plated plastic construction for microwave components which heretofore was not feasible due to the high temperatures required (1100°F) in dip brazing. Sensitive elements may also be incorporated into the assembly prior to bonding such as integrated circuits in waveguide.

Still further it should be noted that with this bonding process only relatively little pressure need be brought on the metallic surfaces to obtain a mechanically strong bond. In other words, with the process described hereinabove, a good electrical and mechanical bond is obtained with pressure in the order of 14 psi (atmospheric pressure) whereas heretofore it was thought that pressures in the order of 200–1500 psi were required in using a polyamide-epoxy adhesive. Shear strengths in the order of 2500 psi have been obtained with pressures in the order of 14 psi. This allows fabrication of microwave components with very fragile structural components such as may be required with flat plate antennas and waveguides.

Although the present invention has been shown and illustrated in terms of a specific apparatus such as flat plate antenna 10, it will be apparent that changes or modifications can be made without departing from the spirit and scope of the invention as defined by the appended claims.

What is claimed is:

1. A method of bonding together sections of aluminum surfaces for fabricating a slotted waveguide type antenna which comprises:
   a. priming one of the aluminum surfaces of one of two antenna sections to be joined, and applying an adhesive film less than 1 mil thick to the primed aluminum surface of the two antenna sections, wherein the primed aluminum surface of one of the sections to be joined is a slotted flat plate and the second section is a plurality of thin wall waveguide shunt guides;
   b. contacting the aluminum surfaces to combine the primer and adhesive material between the aluminum surfaces of the two antenna sections to be bonded together;
   c. positioning the contacting sections in a vacuum bag adaptable, when subject to a vacuum, to the form of the antenna sections;
   d. evacuating the vacuum bag to exert a selected uniform bonding pressure on the antenna section; and
   e. heating said vacuum bag containing the antenna sections to an adhesive curing temperature to bond together the antenna sections.

2. A method of bonding together metal surfaces of microwave waveguide sections for fabricating light weight microwave waveguides or the like which comprises:
   a. priming the metal surfaces of the sections;
   b. applying an adhesive film less than one mil thick on a backing material to the primed metal surface to a first one of the sections to be bonded together to insure proper positioning and uniform thickness of the bonding material for alleviating bridging and warping of the bonded sections;
   c. removing the backing material from the adhesive film;
   d. contacting the primed metal surface of a second section to be bonded to the adhesive film carried by the first section;
   e. positioning the contacting sections in a vacuum bag adaptable, when subjected to a vacuum, to the form of the contacting sections;
   f. evacuating said vacuum bag to exert a uniform pressure of about 14 psi on the sections; and
   g. heating said vacuum bag containing the sections to a curing temperature to bond the sections together.

3. A method of bonding together metal surfaces of microwave waveguide sections according to claim 2, wherein said vacuum bag containing the sections to be joined is heated to a temperature of about 350°F for about 1 hour to form a waveguide.

4. A method of bonding together metal surfaces of microwave waveguide sections according to claim 3, wherein the temperature is allowed to fall after about 1 hour to about 100°F prior to removal of the waveguide sections.

* * * * *